United States Patent
Patel et al.

(10) Patent No.: US 11,736,337 B2
(45) Date of Patent: Aug. 22, 2023

(54) MANAGING PERFORMANCE OF ELEMENTS PROVIDING A SESSION VIA A MULTI-HOP NETWORK TOPOLOGY

(71) Applicant: Citrix Systems, Inc., Fort Lauderdale, FL (US)

(72) Inventors: Dhawal Patel, Uttar Pradesh (IN); Vikramjeet Singh, Bangalore (IN); Mukesh Garg, Bangalore (IN); Vivek Koni Raghuveer, Bangalore (IN); Venkatesh Vellingiri, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/232,494

(22) Filed: Apr. 16, 2021

(65) Prior Publication Data
US 2022/0337471 A1    Oct. 20, 2022

(51) Int. Cl.
*H04L 41/0631* (2022.01)
*H04L 43/16* (2022.01)

(52) U.S. Cl.
CPC .......... *H04L 41/0631* (2013.01); *H04L 43/16* (2013.01)

(58) Field of Classification Search
CPC ...................................................... H04L 43/16
See application file for complete search history.

(56) References Cited

U.S. PATENT DOCUMENTS

| | | | | |
|---|---|---|---|---|
| 10,659,338 | B1* | 5/2020 | Nataraj | H04L 43/0817 |
| 2014/0078882 | A1* | 3/2014 | Maltz | H04L 41/147 |
| | | | | 370/216 |
| 2016/0034293 | A1* | 2/2016 | Cao | G06F 9/5083 |
| | | | | 718/1 |
| 2018/0324062 | A1* | 11/2018 | Chen | H04L 41/0816 |
| 2020/0162343 | A1* | 5/2020 | Salam | G06N 5/003 |
| 2021/0029559 | A1 | 1/2021 | Agarwal et al. | |

OTHER PUBLICATIONS

International Search Report and Written Opinion on PCT Appl. No. PCT/US2022/023677 dated Jun. 29, 2022.

* cited by examiner

*Primary Examiner* — Andrew C Georgandellis

(57) ABSTRACT

Managing performance of elements providing a session via a multi-hop network topology is provided. A system receives values for factors associated with elements that form hops in a multi-hop network topology. The system determines a performance metric for each hop using the values for one or more factors selected from the factors. The system identifies a hop of the hops as having a performance issue based on the performance metric for the hop exceeding a threshold. The system selects, responsive to the performance metric of the hop exceeding the threshold, an action to take on at least one element forming the hop.

20 Claims, 5 Drawing Sheets

MANAGING PERFORMANCE OF ELEMENTS PROVIDING A SESSION VIA A MULTI-HOP NETWORK TOPOLOGY

BACKGROUND

In network environments, a server can host or provide access to a plurality of resources or applications for a plurality of users.

SUMMARY

This disclosure is directed towards systems and methods of managing performance of elements providing a session via a multi-hop network topology. For example, a server can provide a virtual computing environment. A user of a client computing device can establish a session to the virtual computing environment. During the session, the server can execute a virtual application (or an instance of a virtual application). The user can access the virtual application via the virtual computing environment. However, due to various factors, the performance associated with the overall session may be poor. For example, the session to the virtual application can be provided over a network that includes multiple hops. Hops can include or be formed from, for example, the client device, a gateway service, or one or more servers. Hops can include or be formed from one or more components of or executed by the client device, the gateway service, or the one or more servers. Due to the various factors associated with the session or virtual application, it can be challenging to determine what is the cause of the negative performance, as well as what action the system should take in order to remedy or mitigate the performance issues.

Thus, systems and methods of this technical solution can obtain factors associated with each hop, or elements within the hop. The technical solution can apply heuristics to determine a root cause of a slow session or other negative performance associated with session responsiveness. For example, applying the heuristics, the technical solution can determine whether the slow responsiveness is due to an endpoint (e.g., the client device), an interne service provider ("ISP"), a cloud-based gateway service, a cloud connector, infrastructure associated with the virtual application desktop, or a network hop. The technical solution, using the factors, can determine one or more root causes of degraded session responsiveness across some or all the elements in a network topology corresponding to the data path from the user's endpoint to virtual delivery agent infrastructure. The technical solution can use telemetry and instrumentation from elements in the network topology to obtain values for factors associated with network quality and resource utilization. The elements can include, for example, a virtual application on the endpoint, a gateway, a cloud connector, or a desktop delivery controller.

Thus, using these deterministic factors, systems and methods of this disclosure can determine a particular network path and element that are the cause of the negative session performance, and determine an action to perform on or for the element.

At least one aspect is directed to a method of managing performance of elements in a multi-hop network topology providing sessions between client devices and servers. The method can be performed by one or more processors. The method can include the one or more processors receiving values for a plurality of factors associated with a plurality of elements. The plurality of elements can form a plurality of hops in a multi-hop network topology. A client device can establish a session through the multi-hop network topology to access a service provided by one or more servers. The method can include the one or more processors determining a performance metric for each hop in the plurality of hops using the values for one or more factors selected from the plurality of factors. The method can include the one or more processors identifying a hop of the plurality of hops as having a performance issue based on the performance metric for the hop exceeding a threshold. The method can include the one or more processors selecting, responsive to the performance metric of the hop exceeding the threshold, an action to take on at least one element of the plurality of elements forming the hop.

In implementations, the method can include the one or more processors receiving first values for a first plurality of factors of the plurality of factors from an application executing on the client device. The one or more processors can receive second values for a second plurality of factors of the plurality of factors from an intermediary service executed on an intermediary device in the multi-hop network topology that is intermediary to the client device and the one or more servers providing the service. The one or more processors can receive third values for a third plurality of factors of the plurality of factors from a second service executing on the one or more servers. The first plurality of factors can include at least one of loopback latency, processor utilization of the client device, memory utilization of the client device, connection errors, or latency to internal components of the client device. The second plurality of factors can include at least one of an identifier of a connector used to establish the session with the client device; a resource location of the connector, a public internet protocol ("IP") address, processor utilization, memory utilization, latency associated with the intermediary device, throughput associated with the intermediary device, a domain name service ("DNS") resolution time, or a control path latency at each of a plurality of components. The third plurality of factors can include at least one of an identifier of a connector used to establish the session with the client device; a resource location of the connector, a public internet protocol ("IP") address, processor utilization, memory utilization, latency associated with the intermediary device, throughput associated with the intermediary device, a domain name service ("DNS") resolution time, or a control path latency at each of a plurality of components.

The one or more processors can identify a deployment environment for the service based on a configuration file associated with the client device, wherein the deployment environment comprises one of a virtual application hosted by the one or more servers or the virtual application hosted on-premises. The one or more processors can determine the performance metric for each of the plurality of hops using one or more factor thresholds selected based on the deployment environment.

The method can include the one or more processors accessing a map correlating types of performance issues to types of factors and elements in hops in the multi-hop network topology. The one or more processors can identify, from the map, a first type of performance issue and a corresponding first plurality of factors of the plurality of factors. The one or more processors can identify a first plurality of factor thresholds established for the first type of performance issue. The one or more processors can determine the performance metric based on a comparison of a first plurality of values of the first plurality of factors with the corresponding first plurality of factor thresholds. The one or more processors can determine that the performance metric exceeds a performance metric threshold established for the first type of performance issue. The one or more processors can select the action responsive to the performance metric exceeding the performance metric threshold.

The method can include the one or more processors determining the performance metric based on a number of the first plurality of values that exceeds the corresponding first plurality of thresholds. The method can include the one or more processors identifying, based on the first type of performance issue, a first plurality of factor weights corresponding to the first plurality of factors. The one or more processors can determine performance metric based on the first plurality of values that exceeds the corresponding first plurality of factor thresholds and the corresponding first plurality of factor weights.

The method can include the one or more processors identifying a plurality of factor thresholds established based on nominal sessions between client devices and the one or more servers to access services. The one or more processors can determine the performance metric based on the a comparison of the values for the plurality of factors with the plurality of factor thresholds. The action can include at least one of rebooting the at least one element, generating an electronic ticket for the at least one element, or transmitting an alert to an administrator associated with the at least one element.

At least one aspect is directed to a system to manage performance of elements in a multi-hop network topology providing sessions between client devices and servers. The one or more processors can receive values for a plurality of factors associated with a plurality of elements forming a plurality of hops in a multi-hop network topology through which a client device establishes a session to access a service provided by one or more servers. The one or more processors can determine a performance metric for each hop in the plurality of hops using the values for one or more factors selected from the plurality of factors. The one or more processors can identify a hop of the plurality of hops as having a performance issue based on the performance metric for the hop exceeding a threshold. The one or more processors can select, responsive to the performance metric of the hop exceeding the threshold, an action to take on at least one element of the plurality of elements forming the hop.

In implementations, the one or more processors can receive first values for a first plurality of factors of the plurality of factors from an application executing on the client device. The one or more processors can receive second values for a second plurality of factors of the plurality of factors from an intermediary service executed on an intermediary device in the multi-hop network topology that is intermediary to the client device and the one or more servers providing the service. The one or more processors can receive third values for a third plurality of factors of the plurality of factors from a second service executing on the one or more servers.

The first plurality of factors can include at least one of loopback latency, processor utilization of the client device, memory utilization of the client device, connection errors, or latency to internal components of the client device. The second plurality of factors can include at least one of an identifier of a connector used to establish the session with the client device; a resource location of the connector, a public internet protocol ("IP") address, processor utilization, memory utilization, latency associated with the intermediary device, throughput associated with the intermediary device, a domain name service ("DNS") resolution time, or a control path latency at each of a plurality of components. The third plurality of factors can include at least one of an identifier of a connector used to establish the session with the client device; a resource location of the connector, a public internet protocol ("IP") address, processor utilization, memory utilization, latency associated with the intermediary device, throughput associated with the intermediary device, a domain name service ("DNS") resolution time, or a control path latency at each of a plurality of components.

The one or more processors can identify a deployment environment for the service based on a configuration file associated with the client device, wherein the deployment environment comprises one of a virtual application hosted by the one or more servers or the virtual application hosted on-premises. The one or more processors can determine the performance metric for each of the plurality of hops using one or more factor thresholds selected based on the deployment environment.

The one or more processors can access a map correlating types of performance issues to types of factors and elements in hops in the multi-hop network topology. The one or more processors can identify, from the map, a first type of performance issue and a corresponding first plurality of factors of the plurality of factors. The one or more processors can identify a first plurality of factor thresholds established for the first type of performance issue. The one or more processors can determine the performance metric based on a comparison of a first plurality of values of the first plurality of factors with the corresponding first plurality of factor thresholds. The one or more processors can determine that the performance metric exceeds a performance metric threshold established for the first type of performance issue. The one or more processors can select the action responsive to the performance metric exceeding the performance metric threshold.

The one or more processors can determine the performance metric based on a number of the first plurality of values that exceeds the corresponding first plurality of thresholds. The one or more processors can identify, based on the first type of performance issue, a first plurality of factor weights corresponding to the first plurality of factors. The one or more processors can determine performance metric based on the first plurality of values that exceeds the corresponding first plurality of factor thresholds and the corresponding first plurality of factor weights.

The one or more processors can identify a plurality of factor thresholds established based on nominal sessions between client devices and the one or more servers to access services. The one or more processors can determine the performance metric based on the a comparison of the values for the plurality of factors with the plurality of factor thresholds. The action can include at least one of rebooting the at least one element, generating an electronic ticket for the at least one element, or transmitting an alert to an administrator associated with the at least one element.

At least one aspect is directed to a non-transitory computer-readable medium storing processor executable instructions that, when executed by one or more processors, The details of various embodiments of the disclosure are set forth in the accompanying drawings and the description below.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

Systems and methods of managing performance of elements in a multi-hop network topology are provided. A user of a client device can establish a session to access a virtual application or desktop that is hosted on a server. The client device can access the virtual application through the session through multiple hops. A hop can occur when a data packet is passed from one network segment or element to the next network element or segment. However, due to the different types of elements forming each hop, the number of different hops, or the different providers or administrators associated with each hop, it can be challenging to determine which hop or element is the root cause of poor session responsiveness. For example, it can be challenging to obtain factors associated with each hop, or efficiently and accurately process the factors to determine whether a particular hop is the root cause of the performance issue. Thus, system and methods of this technical solution can obtain values for factors associated with elements in a multi-hop network topology and process the values and factors to correlate a performance issue with a particular hop or element in the multi-hop network topology. The technical solution can select an action to perform on or for one or more elements in the hop, thereby mitigating or resolving the performance issue to improve the responsiveness of the session between the client device and the one or more servers.

For purposes of reading the description of the various embodiments below, the following descriptions of the sections of the specification and their respective contents can be helpful:

Section A describes a computing environment which can be useful for practicing embodiments described herein.

Section B describes systems and methods for managing performance of elements in a multi-hop network topology.

A. Computing Environment

Prior to discussing the specifics of embodiments of the systems and methods of managing performance of elements in a multi-hop network topology, it may be helpful to discuss the computing environments in which such embodiments may be deployed.

Figure 1A:
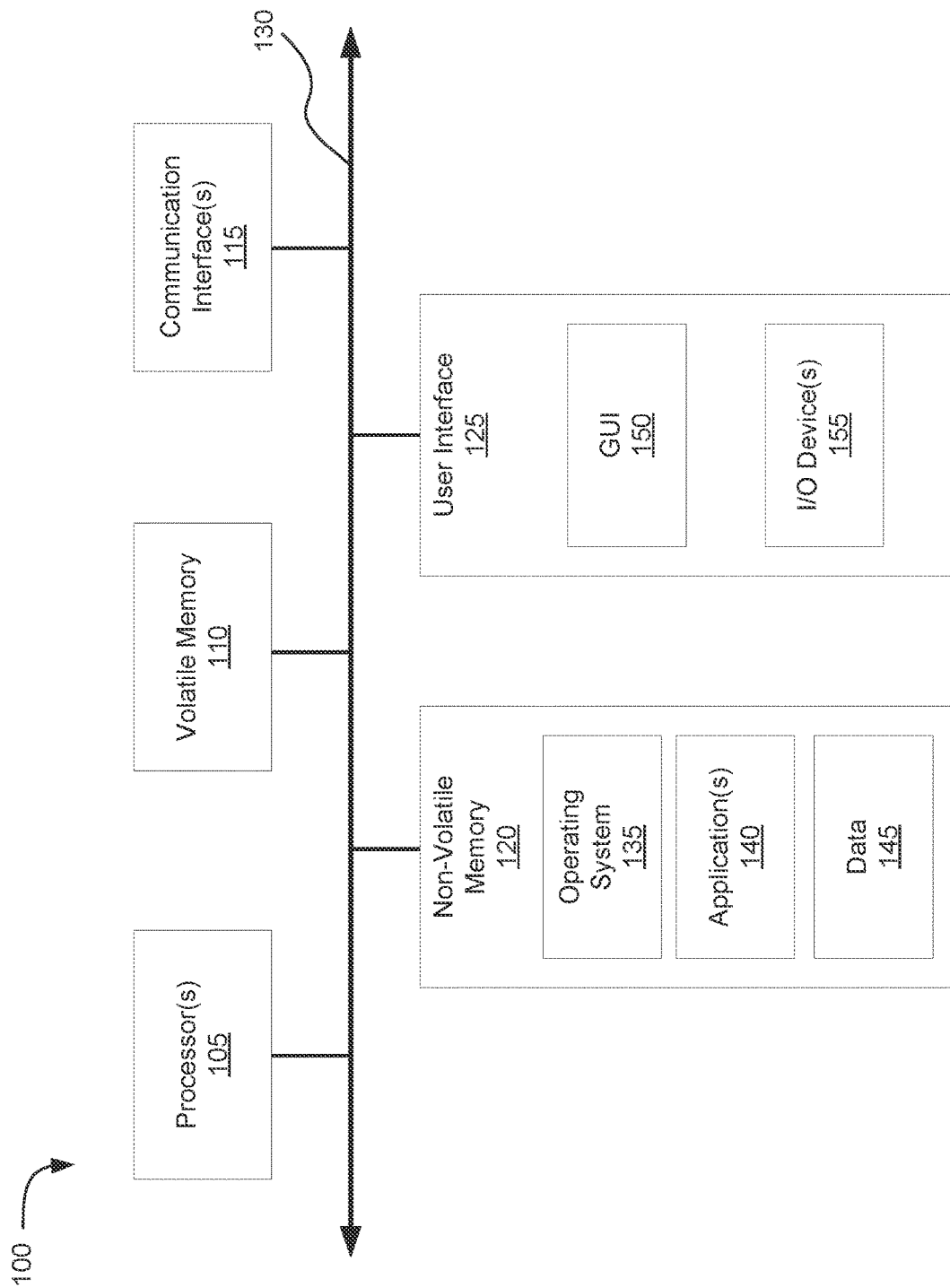
FIG. 1A is a block diagram of embodiments of a computing device.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
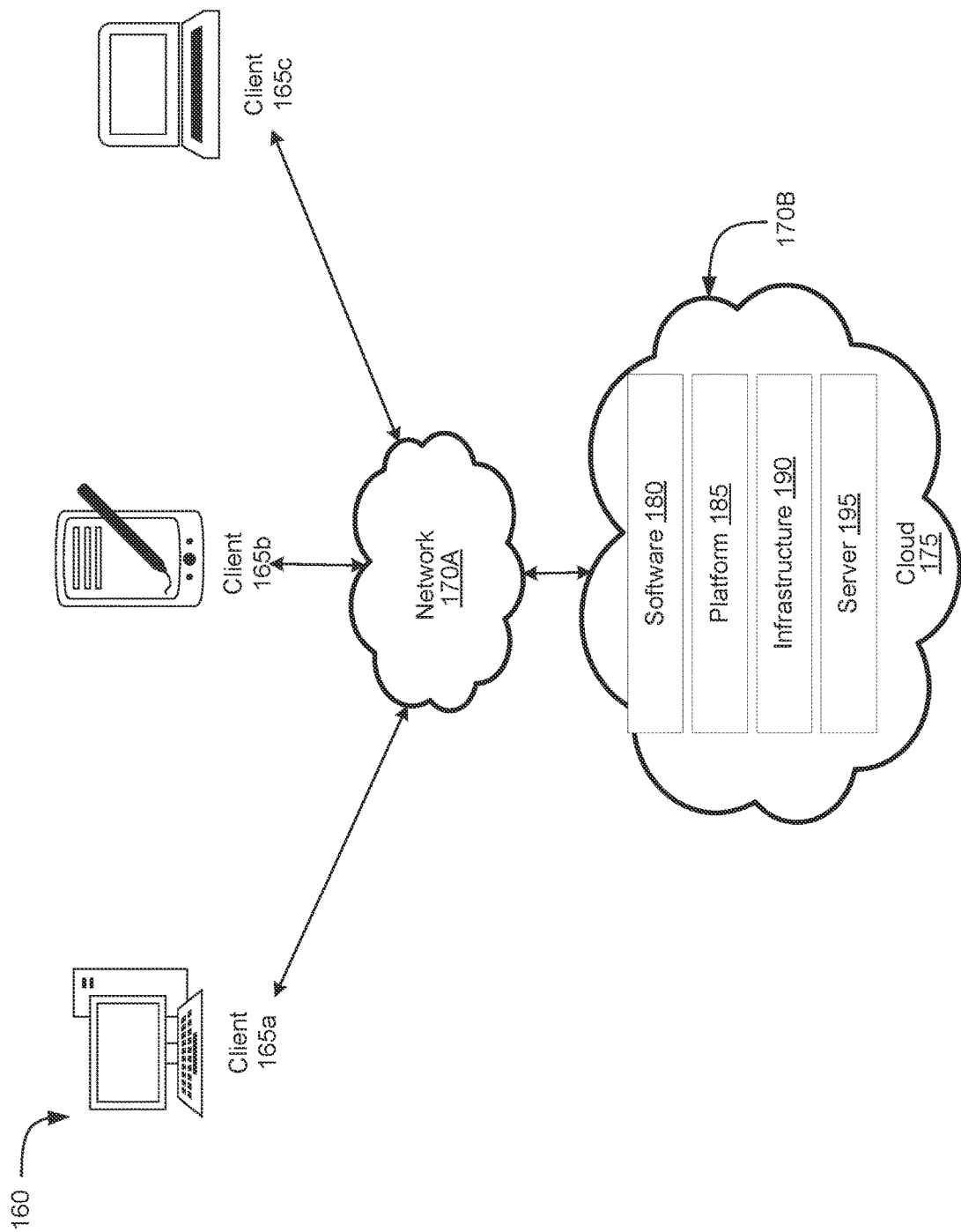
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Was., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Systems and Methods for Managing Performance of Elements in a Multi-Hop Network Topology Systems and methods of managing performance of elements in a multi-hop network topology are provided. User of a client device or end-point can launch, invoke or otherwise establish or access a session. The session can refer to accessing or using a virtual application or virtual desktop that is hosted on a server, data center, or cloud computing environment. The server can host the application, and the client device can be remote from the server. Thus, the client device can access the application hosted on the server through a network.

The client device can access the virtual application through the session through multiple hops. A hop can occur when a data packet is passed from one network segment or element to the next network element or segment. For example, the data packets can pass from the client device to one or more routers, gateways, or servers. The performance of the session can be based on a performance associated with each hop in the network topology. However, due to the different types of elements forming each hop, the number of different hops, or the different providers or administrators associated with each hop, it can be challenging to determine which hop or element is the root cause of poor session responsiveness. For example, it can be challenging to obtain factors associated with each hop, or efficiently and accurately process the factors to determine whether a particular hop is the root cause of the performance issue. Thus, system and methods of this technical solution can obtain values for factors associated with elements in a multi-hop network topology and process the values and factors to correlate a performance issue with a particular hop or element in the multi-hop network topology. The technical solution can select an action to perform on or for one or more elements in the hop, thereby mitigating or resolving the performance issue to improve the responsiveness of the session between the client device and the one or more servers.

For example, slow responsiveness of a session can be due to one or more of the following hops: i) cloud connector to virtual delivery agent; ii) endpoint to a gateway service on the cloud; iii) a gateway service on the cloud to the cloud connector; or iv) an external issue associated with the endpoint, such as internet strength of other delays with the client device. The system and method of this disclosure can obtain values for factors associated with one or more elements in each of these hops to determine which hop or element has a performance issue, thereby providing visibility into the root-cause of the performance issue.

At one or more hops, the responsiveness of the session can depend on one or more factors, including, for example, a round trip time ("RTT") of the protocol used for an application server (e.g., an Independent Computing Architecture RTT), a data center ("DC") latency (e.g., average latency caused by the server network), wide area network ("WAN") latency (e.g., average latency caused by the client side network), ICA network latency, host delay, cloud delay, bandwidth, client and server recovery time objective ("RTO") (e.g., the duration of time to restore a service after a disruption), client side internet strength, location, or client delay.

The system can obtain values or information on the following factors from the cloud gateway service or cloud connector hosted on the data center or server. A factor associated with the data center or one or more servers can include, for example, an indication of an instance of a cloud connector element used by a client device to log into or establish the session. A factor associated with the cloud connector can include a resource location in which the cloud connector resides. A resource location refers to a location where resources reside, such as a public or private cloud, branch office, or data center. The resource location can be set based on proximity to client devices, proximity to data, scale requirements, or security attributes. A factor can include a public internet protocol ("IP") address of the gateway service or connector. A factor can include processor (e.g., CPU) utilization or memory utilization. A factor can include gateway point-of-presence ("POP") details, such as latency, throughput, or domain name service ("DNS") resolution time. A factor can include control path latencies at each component, such as the gateway or cloud connector. A factor can include network latencies to each component through the cloud connector. A factor can include the number of session reconnects through a protocol, such as the ICA protocol. A factor can include the number of concurrent connections at the cloud connector.

The system can obtain values for factors associated with the endpoint or client device. Factors associated with the client device can include, for example, loopback latency, CPU utilization, memory utilization, connection errors, or latency to internal components.

The system can obtain the data, such as values for these factors, from different components or elements in the multi-hop network topology. The system can generate a baseline to co-relate the data to determine which elements or hops are associated with a particular problem or type of performance issue. For example, the system can correlate the date to determine which component a type of performance issue is associated with. The factors used to determine the performance issue and corresponding hop or component can include: a round trip time, DC latency, WAN latency, ICA network latency host delay/cloud delay, bandwidth, client and server RTO, client interne strength, client location, or client delay.

The following table provides an example correlation between factors and elements in a multi-hop network topology:

TABLE 1

Factors and Element Correlation

| Factor | Element(s) in Hop |
|---|---|
| DC Latency | Connect-Virtual Delivery Agent ("VDA") |
| WAN Latency | Endpoint-Cloud, Cloud-Connector |
| Host Delay/Cloud Delay | Internal |
| Location of Endpoint | Element at endpoint location |
| Gateway IP | Gateway |
| ICA Network Latency | Endpoint-Cloud, Cloud-Connector |
| Bandwidth | Endpoint-Cloud, Cloud-Connector, Connector-VDA |
| Server RTO | Cloud-Connector, Connector-VDA |
| Client RTO | Endpoint-Cloud |
| Client Details (ISP Name, Internet Strength, Client Delay) | Client |

The system can process the above factors to identify the performance issue and correlated hop or element(s) in the hop. To do so, the system can select a function based on a type of deployment environment for the client device. The deployment environment can indicate where elements are located in the multi-hop network topology. The deployment environment can indicate which elements are located in the multi-hop network topology. The deployment environment can be established by a customer, administrator, organization, or other entity. The system can determine the deployment environment based on a configuration file. The deployment environment can include, for example, a gateway service, virtual workspace, and desktop delivery controller all located in a cloud computing environment. In another deployment environment, the configuration can include a gateway located in the cloud, a virtual workspace application located on customer premises, and the desktop delivery controller located in the cloud.

The system can use the factors to determine a performance issue by comparing values for the factors with a threshold for the factor. The threshold can be established based on session that are performing in a satisfactory manner. For example, the threshold for the following factors can be established or determined based on historical data corresponding to sessions that are performing well or in an otherwise satisfactory or acceptable manner: DC latency, WAN latency, ICA network latency, server/client RTO, or host delay/cloud delay.

The following table correlates a performance issue at one or more elements in a hop with factors and corresponding factor weights:

TABLE 2

Illustrative example of performance issues at a hop correlated with factors.

| Hop with Performance Issue (P) | Factors with weights ($F_w$) |
|---|---|
| User internet connection | Internet connection strength (0.6), client delay (0.4), Pthreshold (0.5) |
| Cloud (gateway)-Connector | WAN latency (0.7), server RTO (0.2), ICA network latency (0.1), Pthreshold (0.33) |

TABLE 2-continued

Illustrative example of performance issues at a hop correlated with factors.

| Hop with Performance Issue (P) | Factors with weights ($F_w$) |
|---|---|
| Connector-VDA | DC Latency (0.7), server RTO (0.3), Pthreshold (0.5) |
| Within DDC | Server RTO (0.6), WAN latency (0.2), DC latency (0.2), Pthreshold (0.33) |

To determine whether a particular hop has a performance issue or problem, the system compares the values of the corresponding factors ($F_{value}$) with a factor threshold ($F_{threshold}$). If the $F_{value} > F_{threshold}$, then that factor is problematic and $P_{value}$ is set to equal 1. If $F_{value} < F_{threshold}$, then that factor is not problematic, and $P_{value}$ is set to equal 0. Based on the Pvalue of all factors in for a given performance issue (P) with the weight value Fw, the system calculates the cumulative P value as $P_{cumulative}$. If Pcumulative>Pthreshold, then the problem or performance issue exists at the hop indicated in Table 2. Pthreshold can be determined based on averaging the factor weights for a type of performance issue: Pthreshold=(F1w+F2w+F3w ... FNw)/Number of Factors. For example, for user interne connection, Pthreshold=(0.6+0.4)/2=0.5. Pcumulative=(P1value*F1w+P2value*F2w+P3value*F3w ... +PNvalue*FNw). PNvalue=Pvalue for the Nth factor. FNw=Nth Factor weight.

Figure 2:
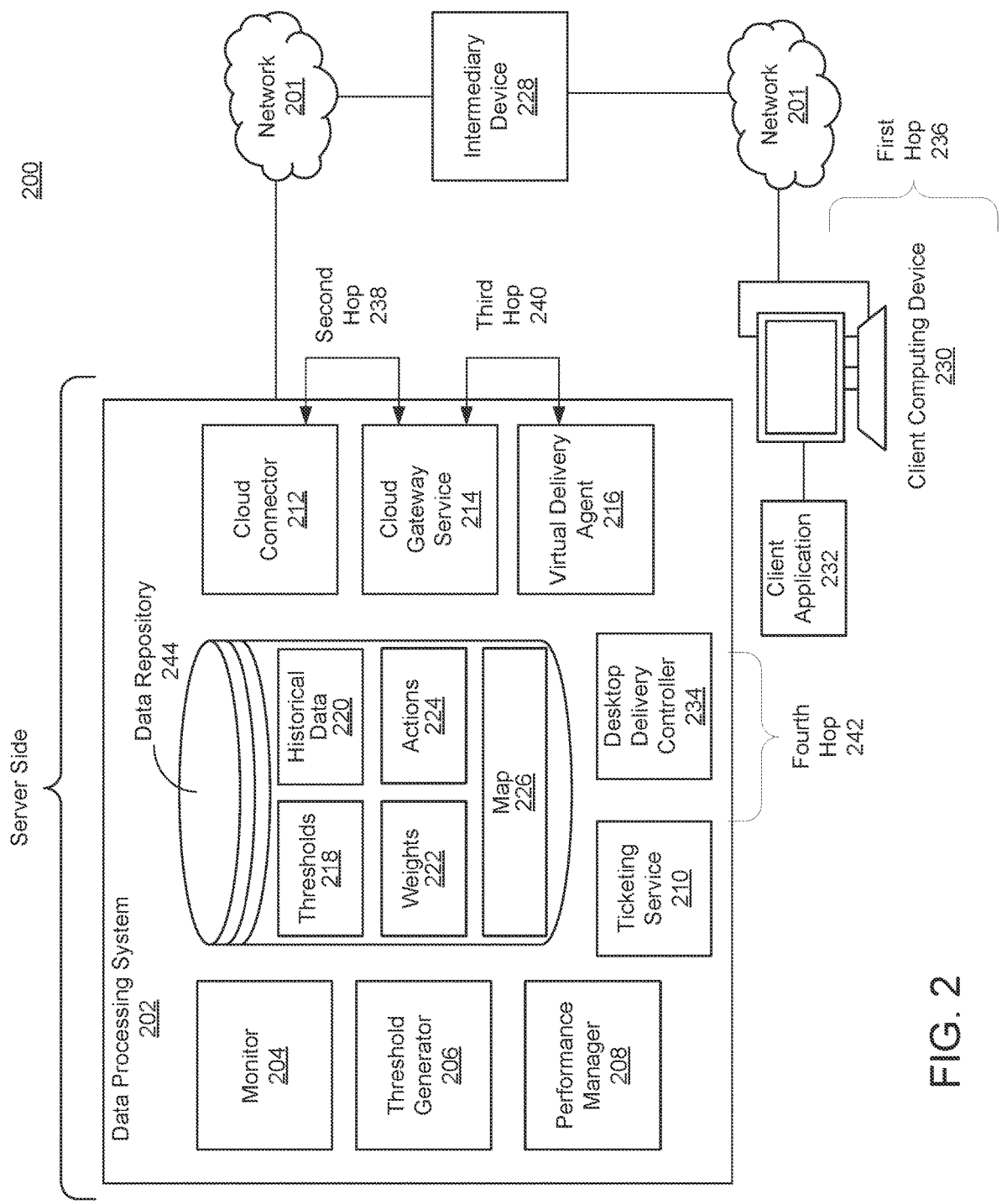
FIG. 2 is a block diagram of a system to manage performance of elements in a multi-hop network topology, in accordance with an implementation.

Referring to FIG. 2, depicted is a block diagram of a system for managing performance of elements in a multi-hop network topology, in accordance with an implementation. The system 200 can include a data processing system 202 that can interface or communicate with a client computing device 230 via a network 201 (e.g., network 170 or network 170A, or network 170B). The data processing system 202 can interface or communicate with an intermediary device 228 via a network 201. The data processing system 202 can include one or more servers, such as servers 195, or be part of the cloud 175. The data processing system 202 can include or be part of a data center. The data processing system 202 can include or be referred to as one or more processors, or one or more servers, or a cloud computing environment. The client computing device 230 can include one or more component or functionality of client device 165a-c depicted in FIG. 1B. The application vendor can include or refer to a vendor, provider, or administrator of a virtual application that is hosted or executed in a virtual computing environment.

The data processing system 202 can include a monitor 204 that can collect information associated with a session or one or more hops in the multi-hop network topology. The data processing system 202 can include a threshold generator 206 can generate a threshold based on weights to be used to determine a performance metric. The data processing system 202 can include a performance manager 208 that can generate a command or action to improve session performance or responsiveness in a virtual computing environment. The data processing system 202 can include or access a ticketing service 210 that can generate or receive tickets indicative of performance issues or problems with a session. The data processing system 202 can include a cloud connector 212, cloud gateway service 214, virtual delivery agent 216, and desktop delivery controller ("DDC") 234 that can provide a virtual desktop environment or virtual application via a client application 232 on a client computing device 230.

The monitor 204, threshold generator 206, performance manager 208, ticketing service 210, cloud connector 212, cloud gateway service 214, virtual delivery agent 216, DDC 234 can each include at least one processing unit or other logic device such as programmable logic array engine, or module configured to communicate with one or more other system or component depicted in FIG. 2. The monitor 204, threshold generator 206, performance manager 208, ticketing service 210, cloud connector 212, cloud gateway service 214, virtual delivery agent 216, and DDC 234 can be separate components, a single component, or part of the cloud 175 or server 195. In some cases, a portion of the virtual delivery agent 216 can be provided by a data center or server that is located at a different location, such as an on premises data center. In some cases, aspects or functionality of the gateway service 214 can be provided by the intermediary device 228. The system 200 and its components can include hardware elements, such as one or more processors, logic devices, or circuits.

The data processing system 202, client computing device 230 or intermediary device 228 can include or be implemented using hardware or a combination of software and hardware. For example, components of the data processing system 202, client computing device 230 or intermediary device 228 can include logical circuity (e.g., a central processing unit or CPU) that responses to and processes instructions fetched from a memory unit. Components of the data processing system 202, client computing device 230 or intermediary device 228 can include or use a microprocessor or a multi-core processor. A multi-core processor can include two or more processing units on a single computing component. Components of the data processing system 202, client computing device 230 or intermediary device 228 can be based on any of these processors, or any other processor capable of operating as described herein. Processors can utilize instruction level parallelism, thread level parallelism, different levels of cache, etc. For example, the data processing system 202, client computing device 230 or intermediary device 228 can include at least one logic device such as a computing device or server having at least one processor 105. The components and elements of the data processing system 202, client computing device 230 or intermediary device 228 can be separate components or a single component. The data processing system 202, client computing device 230 or intermediary device 228 can include a memory component, a random access memory (RAM) or other dynamic storage device, a storage device for storing information, and instructions to be executed. The memory can include at least one read only memory (ROM) or other static storage device coupled with the storage device for storing static information and instructions. The memory can include a storage device, such as a solid state device, magnetic disk or optical disk, to persistently store information and instructions.

The intermediary device 228 can be intermediary or between the client computing device 230 and the data processing system 202 in the network topology. In some cases, the intermediary device 228 can refer to a location of an organization or entity, such as a branch office, having one or more servers or data centers associated with the entity or organization. The intermediary device 228 can be used to authenticate or provide single sign on services to the client device 230. The intermediary device 228 can communicate with the data processing system 202 to provide virtual applications or a virtual desktops or other resources. In some cases, the resource location can be on the intermediary device 228, which can include one or more servers.

Still referring to FIG. 2, and in further detail, the system 200 can include, access, communicate with, or otherwise interface with a client computing device 230 that executes or provides a client application 232. The client computing device 230, via client application 232, can establish a session with the data processing system 202 (e.g., via the virtual delivery agent 216). The session can refer to a session to access web or SaaS delivered application from the data processing system 202. The client computing device 230 can include one or more client applications 232, such as a web browser or agent, configured to establish a session with the data processing system 202 to access one or more virtual applications.

The client application 232 can include one or more components, such as an embedded browser, a networking agent, a cloud services agent (e.g., a management agent), a remote session agent (e.g., a High-Definition User Experience "HDX" engine), and/or a secure container, e.g., a secure cache container). One or more of the components can be installed as part of a software build or release of the client application 232, or separately acquired or downloaded and installed/integrated into an existing installation of the client application 232 for instance. The client computing device 230 can download or otherwise receive the client application 232 (or any component) from the data processing system 202. In some implementations, the client computing device 230 can send a request for the client application 232 to the data processing system 202. For example, a user of the client computing device 230 can initiate a request, download and/or installation of the client application 232. The data processing system 202 in turn can send the client application 232 to the client computing device 230. In some implementations, the data processing system 202 can send a setup or installation application for the client application 232 to the client computing device 230. Upon receipt, the client computing device 230 can install the client application 232 onto a hard disk of the client computing device 230. The client computing device 230 can run the setup application to unpack or decompress a package of the client application 232. The client application 232 can be an extension (e.g., an add-on, an add-in, an applet or a plug-in) to another application (e.g., a cloud services agent) installed on the client computing device 230. The client computing device 230 can install the client application 232 to interface or inter-operate with the pre-installed application. In some cases, the client application 232 can be a standalone application. The client computing device 230 can install the client application 232 to execute as a separate process.

The client application 232 can include elements and functionalities of a web browser application or engine. The client application 232 can locally render virtual applications as a component or extension of the client application 232. For instance, the client application 232 can render a SaaS/Web application inside the client application 232 which can provide the client application 232 with full visibility and control of the application session. The embedded browser can be embedded or incorporated into the client application 232 via any means, such as direct integration (e.g., programming language or script insertion) into the executable code of the client application, or via plugin installation. For example, the embedded browser can include a Chromium based browser engine or other type of browser engine, that can be embedded into the client application, using the Chromium embedded framework (CEF) for instance. The embedded browser can include a HTML5-based layout graphical user interface (GUI). The embedded browser can provide HTML rendering and JavaScript support to a client application incorporating various programming languages. For example, elements of the embedded browser can bind to a client application incorporating C, C++, Delphi, Go, Java, .NET/Mono, Visual Basic 6.0, and/or Python.

In some implementations, the client application 232 can be a plug-in installed on the client application 232. For example, the plug-in can include one or more components. One such component can be an ActiveX control or Java control or any other type and/or form of executable instructions capable of loading into and executing in the client application. For example, the client application 232 can load and run an Active X control of the embedded browser, such as in a memory space or context of the client application. In some implementations, the embedded browser can be installed as an extension on the client application 232, and a user can choose to enable or disable the plugin or extension. The embedded browser (e.g., via the plugin or extension) can form or operate as a secured browser for securing, using and/or accessing resources within the secured portion of the digital workspace.

In some embodiments, the client application 232 can interoperate with the data processing system 202 to access a virtual application. For example, the client application 232 can receive and transmit navigation commands from a user to a virtual application hosted in the virtual computing environment provided via the data processing system 202. The client application 232 can use a remote presentation protocol to display the output generated by the virtual application. For example, the client application 232 can include a HTML5 web client that allows end users to access remote virtual applications or virtual computing environments via the client application 232.

The client application 232 operate on the application layer of the operational (OSI) stack of the client computing device 230. The client application 232 can include and/or execute one or more agents that interoperate with the data processing system 202. The client application 232 can receive, obtain, retrieve or otherwise access various policies (e.g., an enterprise's custom, specified or internal policies or rules) and/or data (e.g., from the data processing system 202, or another server, that can be managed by the enterprise). The client application 232 can access the policies and/or data to control and/or manage a network application (e.g., a SaaS, web or remote-hosted application). Control and/or management of a network application can include control and/or management of various aspects of the virtual application, such as access control, session delivery, available features or functions, service level, traffic management and monitoring, and so on. The virtual application can be from an application vendor device, such as a provider or vendor of the enterprise (e.g., salesforce.com, SAP, Microsoft Office 365), from the enterprise itself, or from another entity (e.g., Dropbox or Gmail service).

The client application 232 can establish a session with the virtual computing environment or to a virtual application hosted by the data processing system 202 or other server. The session can support a remoting protocol (e.g., HDX or ICA). The session can include a remote desktop session and/or remote application session using any variety of protocols, such as the Remote Desktop Protocol (RDP), Appliance Link Protocol (ALP), Remote Frame Buffer (RFB) Protocol, and ICA Protocol. The session can be for a user of the client computing device 230 to access a virtual application. The client application 232 can establish the session within or over a secure connection (e.g., a VPN).

The client application 232 can establish the session through a network topology that includes multiple hops. A hop can refer to or occur when a data packet is passed from one network segment to the next. The network topology can include multiple hops, such as a first hop 236, second hop 238, third hop 240, fourth hop 242, etc. The network topology can include additional hops, and data packets may traverse these hops 236-242 multiple times in various routes to establish the session. For example, the first hop 236 can refer to data packets transmitted at the client side, such as between the client computing device 230 and an interne service provider or router. The second hop 238 can refer to data packets transmitted between the cloud connector 212 and gateway service 214. The third hop 240 can refer to data packets transmitted between the gateway service 214 and VDA 216. The fourth hop 242 can refer to data packets transmitted internal to the DDC 234.

The data processing system 202 or other server can provide or host the virtual computing environment (e.g., a virtual desktop) or virtual applications. The data processing system 202 can provide the virtual computing environment or virtual application via one or more of a virtual delivery agent 216, cloud connector 212 or cloud gateway service 214. By way of a non-limiting example, virtual applications can include network applications from Workday, Salesforce, Office 365, SAP, etc. Example virtual applications can include word processing applications, presentation applications, messaging applications, software development applications, spreadsheet applications, etc. A user instance of a client application 232, that is installed on client computing device 230, can register or authenticate with the data processing system 202 or virtual computing environment. For example, the user can authenticate the user to the client computing device 230 and login to the client computing device 230. The client application 232 can automatically execute, or be activated by the user. In some embodiments, the user can sign in to the client application 232 (e.g., by authenticating the user to the client application 232). In response to the login or sign-in, the client application can register or authenticate the user and/or the client application with the virtual computing environment.

In some cases, the client application 232 can be referred to as a workspace application installed on user devices and other endpoints (such as virtual desktops) to provide users with secure, self-service access to documents, applications, and desktops. The workspace application can provides on-demand access to desktop, web and SaaS applications.

The data processing system 202 can include a provide a single sign-on operation to authenticate the user. For example, in response to a request to authenticate the user, the client application 232 or data processing system 202 can provide credentials of the user for SSO, to access the selected virtual application. The user can establish a session to the virtual application by logging into the virtual application, based on the SSO (e.g., using the credentials). The client application 232 can establish a secure connection and session with the data processing system 202 to access the selected virtual application. The client application 232 can decrypt application traffic received via the secure connection. The client application 232 can monitor traffic sent via the client application 232 and the secured connection to the data processing system 202.

The client application 232 can provide information to the data processing system 202 for analytics processing. For example, the client application 232 can monitor for or capture user interaction events with the selected virtual application. The client application 232 can convey the user interaction events to the data processing system 202, to be processed to produce analytics.

The data processing system 202 can include a cloud connector 212 designed, constructed and operational to serve as a channel for communication between the data processing system 202 and resource locations, allowing for cloud management. The cloud connector 212 can provide connectivity from a cloud or data processing system 202 to resource locations. The cloud connector 212 can includes access to active directory and delivery of control channel traffic between a virtual workspace, virtual application or virtual desktop controllers. The cloud connector 212 can create a connection from the resource location to the nearest POP (e.g., cloud gateway service 214) to establish an initial data channel.

The cloud connector 212 can facilitate the delivery or provision of virtual application and virtual desktops. The cloud connector 212 can allow for endpoint management for enterprise connectivity. The cloud connector 212 can include, provide, or otherwise facilitate active directory, virtual application and virtual desktop publishing, endpoint management, or machine catalog provisioning. For example, cloud connector 212 can provide active directory management, allowing the use of active directory forests and domains within a resource location. The cloud connector 212 can provide mobile device management (MDM) and mobile application management (MAM) environment for managing device and app policies and delivering apps to users. The cloud connector 212 can provide provisioning of machines directly into resource locations.

The cloud connector 212 can authenticate and encrypt communication between the data processing system 202 and the resource locations. The cloud connector 212 can initiate communication through an outbound connection. The cloud connector 212 can establish connection using HTTPS port (443) and the TCP protocol. One or more cloud connectors 212 can be installed at each resource location. For example, installing at least two cloud connectors 212 at a resource location can allow for redundancies in the event one of the cloud connectors 212 is unavailable for any period of time, thereby allowing the other cloud connector 212 to maintain a session or connection. The cloud connector 212 can be stateless, allowing for the load to be distributed across available cloud connectors 212.

A resource location can contain the resources used to deliver cloud services to the client computing device 230. Resource locations can contain different resources depending on which cloud services are being used or are configured for the client computing device 230. A resource location can be created by installing one or more cloud connectors on a server to allow the resources to communicate with the cloud. For example, the resource location can refer to a domain, portion or partition hosted on the cloud or data processing system 202, and the cloud connector 212 can be installed on the portion or partition of the cloud corresponding to the resource location.

The resource location can include different types of resources based on the types of virtual application, desktops or services provided or configured for a client computing device 230. For example, to provide a virtual application or desktop service, the resource location can include an active directory user and resource domains, a hypervisor, servers running a virtual desktop agent (VDA) 216, and an on-premises gateway (e.g., intermediary device 228) or cloud gateway service 214, or an on-premises application storefront server to allow users to access resources through a single application store.

An application storefront can authenticate users and manage stores of desktops and applications that users access. The application storefront can host an enterprise application store, which can provide users self-service access to the desktops and applications that made available to them. The application storefront can also keep track of users' application subscriptions, shortcut names, and other data.

The location of resources can on a public or private cloud, a branch office, or a data center. An entity or organization can locate resources on a private data center, or in a data processing system 202 managed by a third-party entity or administrator. The resource location can be set based on proximity to client computing device 230, proximity to data, scale requirements, or security attributes. For example, an entity can establish a first resource location can be in a data center associated with a head office based on subscribers and applications that can benefit from being closer to the data. The entity can establish a second resource location for global users in a public cloud, or at separate resource locations such as in branch offices. The entity can add another resource location on a separate network that provides restricted applications.

The data processing system 202 can include, access, or provide a cloud gateway service 214. The cloud gateway service 214 can provide secure access to web, virtual, and SaaS applications across multiple devices and connections. The cloud gateway service 214 can provide single-sign-on and remote access to SaaS applications, web applications, virtual applications, and virtual desktops. The cloud gateway service 214 can provide global point-of-presence locations. The cloud gateway service 214 can interface with the cloud connector 212 or a gateway connector to provide authentication or a session proxy.

The cloud gateway service 214 can provide a gateway service Point of Presence (POP) with the micro services and tenants that form the service. The cloud gateway service 214 can provide session connectivity (e.g., HDX connectivity) for virtual application and virtual desktops, secure access to SaaS applications, secure access to enterprise web applications, or secure access to mobile apps in a digital workspace.

The gateway service 214 can provide secure remote access and use routing to direct clients computing device 230 to the closest global gateway service POP. From there, the gateway service 214 can coordinate secure connectivity between clients and virtualization resources to deliver sessions with the lowest latency.

The data processing system 202 can include or access a virtual delivery agent ("VDA") 216 designed, constructed, and operational to provide a virtual application or desktop service. The VDA 216 can be installed on each physical or virtual machine on a site that is available to client computing devices 230, or users thereof. The machines (e.g., physical or virtual) on which the VDA 216 is installed can deliver applications or desktops. The VDA 216 can register with a controller, which in turn allows the machine and the resources it is hosting to be made available to users. VDA 216 can establish and manage the connection between the machine and the user device. The VDA 216 can communicate session information to a controller.

The data processing system 202 can include a DDC 234 which can be a server-side component or element that manages user access, brokers connections and optimizes connection. The DDC 234 can provide machine creation services to create desktop and server images. There can be one or more controllers 234 for a particular site or resource location. The controller 234 can communicate with a resource location or site or zone. The VDA 216 can register with the controller 234 before the VDA 216 is usable. In some cases, the DDC 234 can act as a traffic controller, directing a client device 230 to an assigned desktop based on user credentials.

The data processing system 202 can include a monitor 204 designed, constructed and operational to collect data from or about elements in the multi-hop network topology. The monitor 204 can collect data from one or more client computing devices 230, intermediary devices 228, or components in the data processing system 202, such as the cloud connector 212, cloud gateway service 214, or VDA 216. The monitor 204 can collector values for factors associated with one or more elements in the system 200 or associated with the network topology that provide the session established by the client computing device 230 to access a service, such as a virtual application of virtual desktop provided via the data processing system 202 or other provided of virtual applications.

The monitor 204 can collect values based on a time interval, such as every minute, 2 minutes, 3 minutes, 5 minutes, 10 minutes, 15 minutes, or other time interval. The monitor 204 can receive values in real-time, or a stream or data feed of values. The monitor 204 can transmit requests to the various elements for values of factors. The elements can be configured to push or upload values to the monitor 204. The monitor 204 can receive values in a batch upload process, such as once every 15 minutes. The monitor 204 can receive values for factors associated with each session of each client computing device 230.

The monitor 204 can receive values for factors associated with the client application 232 executing on the client computing device 230. The factors associated with the client application 232 or client computing device 230 can include, for example, loopback latency, processor utilization of the client computing device 230, memory utilization of the client computing device 230, connection errors, or latency to internal components of the client computing device 230. Loopback latency can refer to the duration it takes for data packets to travel from the client device 230 to the next hop and return back to the client device 230. For example, the loopback latency can correspond to data packets transmitted from the client device 230 and going to the intermediary device 228 or a cloud gateway service 214 and returning back to the client device 230. Values for the loopback latency can be in milliseconds, such as 100 ms, 200 ms, 300 ms, or other duration.

The monitor 204 can receive the processor utilization or memory utilization of the client computing device 230 from a task manager or performance monitor executing on the client device 230. Values for processor utilization can be a percentage of processor capacity. Values for memory utilization can be an amount megabytes or gigabytes of memory that are used or available, or a percentage of available or used memory. The monitor 204 can collect data using a program, system or function of the operating system executing on the client computing device 230. For example, the monitor 204 can collect processes data from a Windows Management Instrumentation ("WMI") provided for the Windows Operating system provided by Microsoft Corporation of Redmond, Wash. The monitor 204 can collected processes data using a web-based enterprise management or common information model standards. WMI can include a set of extension to a driver model that provides an operating system interface through which components of the operating system can provide information and notification. The monitor 204, using scripts, programs, or other tools (e.g., VBscript or Windows Powershell) can manage the virtual computing environment during the session. The WMI can provide and event viewer or task manager functionality that can determine processor and memory utilization of the client computing device 230 during the session.

The monitor 204 can determine connection errors associated with the client computing device 230. Connection errors can refer to or include errors connecting to or establishing a session. Connection errors can refer to dropped connections, or unable to connect to a data processing system 202 or session or other network. Values for connection errors can be a number of connection errors for a session or a number of connection errors during a time interval. Values for connection errors can be a frequency or rate of connection errors per time interval or session. The monitor 204 can determine latency associated with internal components of the client computing device 230, such as latency associated with read/write to a hard drive or storage device or memory. The latency between internal components can refer to latency between applications executed on the client device 230, such as the client application 232 and other components. Values for latency can be in seconds or milliseconds.

The monitor 204 can receive values for factors from the intermediary device 228 or data processing system 202, including, for example, one or more of an identifier of a connector used to establish the session with the client device, a resource location of the connector, a public internet protocol ("IP") address, processor utilization, memory utilization, latency associated with the intermediary device, throughput associated with the intermediary device, a domain name service ("DNS") resolution time, or a control path latency at each of a plurality of components.

Depending on the deployment type, certain factors can be associated with the intermediary device 228 or the data processing system 202 or other elements or components used to provide the session. For example, the resource location can be on a device located at a branch office associated with an entity or organization. The resource location can be on a cloud, such as the data processing system 202. The identifier of the connector can refer to an IP address or other identifier associated with the cloud connector 212. In some cases, the deployment type can include multiple connectors, in which case the identifier can identify the particular connector being used for the session established by the client computing device 230.

The data processing system 202 can include a threshold generator 206 designed, constructed and operational to generate a threshold for use by the performance manager 208 to determine a performance metric. The threshold generator 206 can generate a threshold for each factor. For example, each factor can have its own threshold. The threshold generator 206 can generate a threshold for each factor and type of deployment. The threshold generator 206 can generate customized thresholds for a particular deployment, entity, organization, user, type of session, etc.

To generate a threshold for a factor, the threshold generator 206 can receive values for the factor. The threshold generator 206 can receive values for the factor over a time interval. The values can be historical values, and stored as historical data 220 in data repository 244. The values and time interval can corresponding to a baseline session or a session that is performing well or as expected or desired. The threshold generator 206 can determine a threshold for the factor based on the values for the factor over the time interval, which can be stored as historical data 220. The threshold generator 206 can use a statistical technique to determine a threshold value for the factor that indicates whether the factor is satisfactory or problematic or indicative of a performance issue. The threshold can be based on an average value, a standard deviation of the mean of the value over the time interval, or two standard deviations of the mean of the value over the time interval. In some cases, the threshold can be predetermined or preconfigured for a factor. For example, a threshold for processor utilization or memory utilization can be 50%, 60%, 70%, 80% or other percentage.

The threshold generator 206 can generate thresholds for performance issues. The threshold for the performance issue can be based on a combination of weights associated with factors. The weights for the factors can be stored in the weights data structure 222 in the data repository 244. For example, the performance threshold for a performance issue can be an average of the factor weights associated with factors used to determine the performance issue.

The threshold generator 206 can store thresholds in a threshold data structure 218 in the data repository 244. The threshold data structure 218 can include threshold values for each type of factor. The threshold data structure 218 can include predetermined thresholds, and thresholds generated by the threshold generator 206. The threshold data structure 218 can include thresholds established for particular deployment types, entities, organizations, or thresholds that are aggregated across multiple users, entities, customers, or organizations. The threshold generator 206 can update thresholds in the thresholds data structure 218 based on a time interval or responsive to an update or other request.

The data processing system 202 can include a performance manager 208 designed, constructed and operational to determine a performance metric based on values for factors. The performance manager 208 can determine a performance metric for each hop in the multi-hop network topology hops using the values for one or more factors selected for the hop. The performance manager 208 can identify a hop in the multi-hop network topology as having a performance issue based on the performance metric for the hop exceeding a threshold. The performance manager can select, responsive to the performance metric of the hop exceeding the threshold, an action to take on at least one element in the hop.

The performance manager 208 can access a map 226 stored in the data repository 244 that includes a correlation of types of problems or performance issues to factors to use to determine the problem or performance issue. The map data structure 226 in data repository 244 can correlate the types of performance issues to the types of factors and elements in the multi-hop network topology. The performance issues can correspond to hops in the multi-hop network topology. For example, Table 2 illustrates an example map 226. From the map 226, the performance manager 208 can identify, for each type of performance issue, a corresponding set of factors correlated to elements in a hop. For example, as illustrated in Table 2, a first performance issue associated with a session can be user internet connection. The first performance issue can be correlated with the first hop 236 on the client side. The factors associated with the first performance issue of the first hop 236 can include internet connection strength at the client computing device 230, and client delay. The internet connection strength factor can have a factor weight of 0.6, and the client delay factor can have a factor weight of 0.4. The weights for each factor can be predetermined or preconfigured, or established by an administrator. The first performance issue can be associated with a client side hop 236. The performance threshold for the first performance issue can be 0.5, which can be an average of the factor weights for the first performance issue.

The second performance issue can be associated with a second hop 238 between a cloud gateway service 214 and the cloud connector 212 or other connector 212 (e.g., a connector located on the intermediary device 228 or branch office server). To determine the second performance issue correlated with the second hop 238, the performance manager can use factors such as WAN latency, server RTO, and ICA network latency. The factor weight for the WAN latency factor can be 0.7. The factor weight for the server RTO factor can be 0.2. The factor weight for the ICA network latency can be 0.1. The performance threshold for the second performance issue can be 0.33, which can be an average of the factor weights for the second performance issue.

The third performance issue can be associated with a third hop 240 between the cloud connector 212 (or other connector) and the VDA 216. The third performance issue can be determined based on factors such as the DC latency and server RTO. The weight of the DC latency can be 0.7, and the weight of the server RTO can be 0.3. The performance threshold for the third performance issue can be 0.5, which can be an average of the factor weights for the third performance issue.

The fourth performance issue can be associated with a fourth hop 242 that can be internal to the DDC 234. The fourth performance issue can be determined based on factors such as server RTO, WAN latency, and DC latency. The weight of the server RTO factor can be 0.6. The weight of the WAN latency factor can be 0.2. The weight of the DC latency can be 0.2. The performance threshold for the fourth performance issue can be 0.33, which can be an average of the factor weights for the fourth performance issue.

The weights can be stored in weight data structure 222. The weights for the factors can be customized or set for a type performance issue, deployment type, type of session, geographic location, customer, etc. In some cases, the weights can be predetermined and fixed values. In some cases, the weights can be dynamic or customized. An administrator of the data processing system 202 can set the weights for the factors.

For example, the performance manager 208 can determine a deployment environment for a service accessed during the session. The performance manager 208 can determine the deployment environment based on a configuration file associated with the client device 230. The deployment environment can indicate one of a virtual application hosted by the one or more servers or the virtual application hosted on-premises. For example, the deployment environment can indicate a resource location. The resource location can be in the cloud or part of the data processing system 202. The resource location can be on premises, which can indicate that the resource is located on a customer's data center or customer cite, such as a branch office or office headquarters. For example, the resource location can be the intermediary device 228 or the data processing system 202. If a resource is located on premises, then there may be a storefront located on premises. If a resource is located in the cloud, then there may be a workspace in the cloud.

The performance manager 208 can determine the performance metric for each type of performance issue using the values for the factors corresponding to that type of performance issue and factor thresholds. The factor thresholds can be selected based on the deployment environment. The performance manager 208 can perform a lookup in the thresholds data structure 218 to retrieve factor thresholds for a particular deployment environment. For example, for the deployment environment in which the gateway service, workspace (e.g., resource location), and DDC are all located in the cloud (e.g., data processing system 202), the factor thresholds can be determined using baseline factor values associated with satisfactorily performing sessions. If the deployment environment includes the a gateway service and DDC located in the cloud, but the workspace (e.g., resource location) on premises, then the factor thresholds can be determined using baseline factor values associated with satisfactorily performing sessions with the same deployment environment. Thus, the data processing system 202 can identify the factor threshold based on nominal sessions having the same deployment environment between client devices 230 and one or more servers to access services.

From the map 226, the performance manager 208 can identify the first type of performance issue and the corresponding first set of factors. The performance manager 208 can also identify factor thresholds for the first set of factors, either from map 226 or thresholds data structure 218. To determine the performance metric, the performance manager 208 can compare the value received by monitor 204 for the particular factor with the threshold for the factor. In some cases, and depending on the factor, if the factor value is greater than or equal to the factor threshold, then the performance manager 208 can determine that the factor is problematic and assign the factor a Pvalue of 1. If the value for the factor is less than the factor threshold, then the performance manager 208 can determine that the factor is not problematic, and assign the factor a Pvalue of 0. For some factors, a factor value greater than or equal to the threshold can indicate the lack or absence of a problem, and the factor value being less than or equal to the threshold can indicate the presence of a problem. The performance manager 208 can perform this comparison to determine the Pvalue for each factor associated with the type of performance issue, as illustrated in Table 2.

For example, for the first type of performance issue, user internet connection, the performance manager 208 can determine a value for the first factor (F1) internet connection strength. The value of the first factor (F1value) can correspond to a bandwidth, such as a download speed or an upload speed, or some combination of download and upload speed. If the download speed and upload speed is greater than a threshold, then the performance manager 208 can determine that it is satisfactory. For example, a download speed of 50 Mbps and an upload speed of 10 Mbps can be a satisfactory value and result in a performance value for the first factor (P1value) of 0; whereas a download speed of 1 Mbps and upload speed of 0.5 Mbps can be low internet strength and result in a performance value for the first factor (P1value) of 1.

The performance manager 208 can compare values for the second factor (F2), client delay, of the first type of performance issue to determine the performance value for the second factor (P2value) for the second factor. For example, if the client delay is greater than a threshold duration, then the performance manager 208 can determine this factor is problematic, and assign set P2value=1.

The performance manager 208 can combine the Pvalues to generate a cumulative performance value Pcummlative as follows: Pcummulative=P1value*F1w+P2value*F2w. F1w and F2w can be the factor weights retrieved from the weights data structure 222. The performance manager 208 can multiple the P1value by the first factor weight F1w, and multiply the P2value by the second factor weight F2w, and then sum the two products to determine the Pcummulative. In some cases, Pcummulative can be referred to as the performance metric for a particular performance issue or type of performance issue.

The performance manager 208 can further identify a performance threshold for the performance issue. The performance threshold can be retrieved from thresholds data structure 218, or be determined as the average of the weights for the factors as follows: Pthreshold=(F1w+F2w)/2.

If Pcummulative for the type of performance issue is greater than or equal to the performance threshold, then the performance manager 208 can determine that the first type of performance issue exists or is present at the corresponding hop. If Pcummulative for the type of performance is less than the Pthreshold, then the performance manager 208 can determine that there is no performance issue, or that the hop is performing satisfactorily. Thus, the performance manager 208 can determine the performance metric (e.g., cumulative performance value) based on a number of the factor values that exceeds (or does not satisfy) the corresponding factor thresholds.

The performance manager 208 can determine the factor values, performance values, and cumulative performance for each type of performance issue corresponding to each hop. The performance manager 208 can compare the cumulative performances with the corresponding performance thresholds to identify which of the types of performance issues exist, and the corresponding hops. In some cases, the performance manager 208 can determine that none of the performance issues exist, and all hops are performing satisfactorily. In some cases, the performance manager 208 can determine that one or more of the performance issues exist, and then identify the corresponding one or more hops. For example, if Pcummulative is greater than Pthreshold for one of the performance issues in Table 2, then the performance manager 208 can determine that the corresponding hop has a performance issue.

The performance manager 208 can select an action to perform responsive to the performance metric (e.g., Pcummlative) exceeding the performance threshold. The performance manager 208 can retrieve the actions from the actions data structure 224 stored in data repository 244. In some cases, the action can be included in the map 226. The action can include at least one of rebooting one or more elements in the hop as indicated in the map 226. The performance manager 208 can automatically reboot the one or more elements in the hop corresponding to the performance issue. The performance manager 208 can determine, based on the map 226, which elements are in the hop with the performance issue, and transmit the action to the corresponding elements. For example, the performance manager 208 can automatically reboot the element, re-launch an application, re-launch a virtual application, re-launch a virtual server, or increase available processors or memory.

The action can include generating an electronic ticket with an instruction to perform an action for the one or more elements indicated in the hop in Table 2. The performance manager 208 can transmit an action to a ticketing service 210 to cause the ticketing service 210 to generate a ticket. The action can include an indication of the type of performance issue, an identifier of the element or an identifier of the hop. The ticketing service 210 can generate the ticket and post the ticket on a ticket board or service board to cause a technical support agent to resolve the ticket.

The action can include transmitting an alert to an administrator associated with the element indicated in Table 2. For example, the action can include an alert to an administrator of the internet service provider entity that provides internet service to the client computing device 230 if the performance issue is associated with the client internet connection.

In some cases, the data processing system 202 can receive a ticket via the ticketing service 210 that indicates poor performance. The ticket can be submitted by a user of the client computing device 230. Responsive to receipt of the ticket, the data processing system 202 can collect values for factors to determine performance metrics for each type of performance issue, and then identify the elements in the hop corresponding to the performance issue in order to generate an action to resolve the issue.

Figure 3:
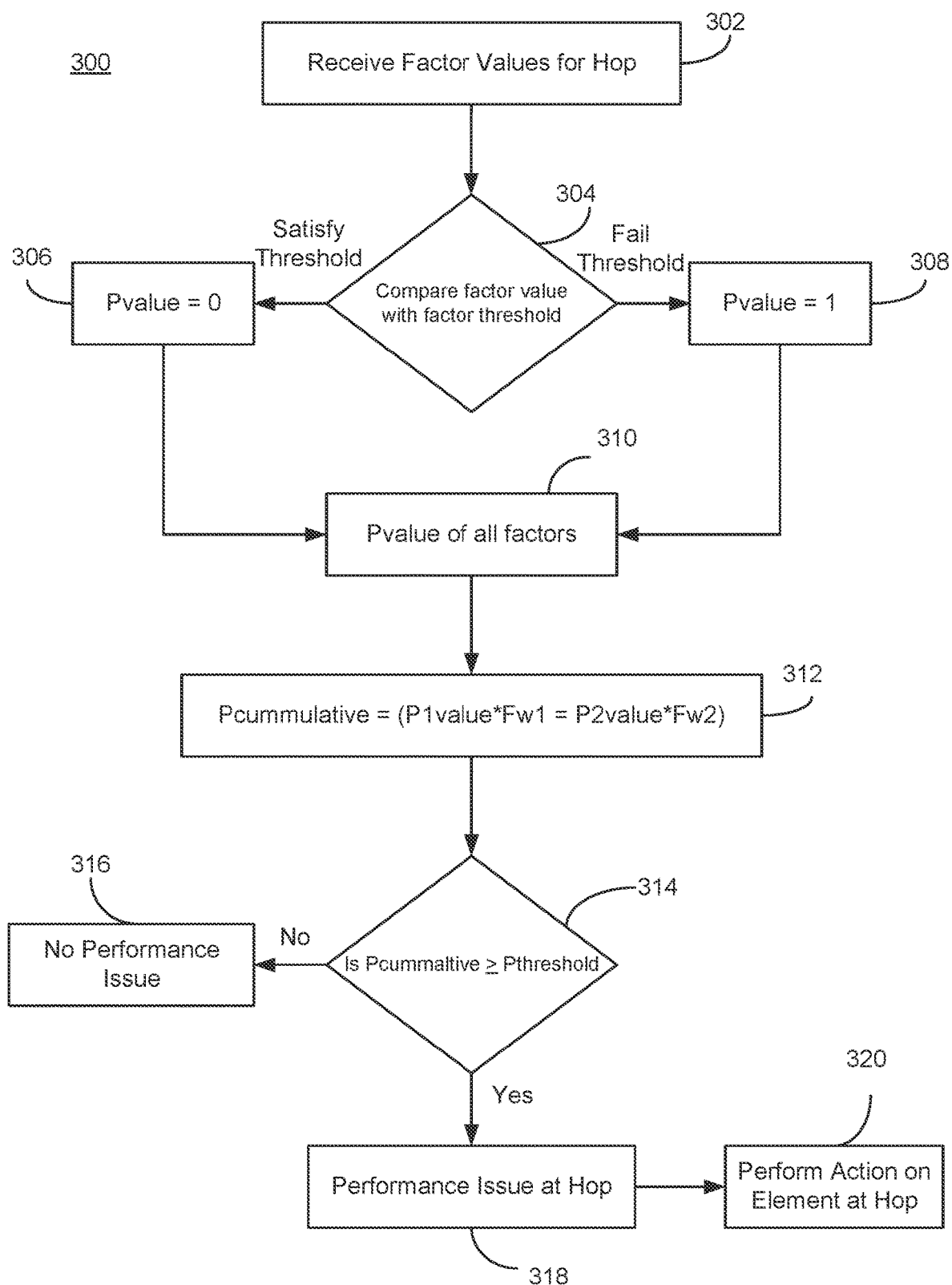
FIG. 3 depicts an example flow diagram of a process for managing performance of elements in a multi-hop network topology, in accordance with an implementation.

FIG. 3 depicts an example flow diagram for managing performance of elements in a multi-hop network topology, in accordance with an implementation. The process 300 can be performed by one or more component or system depicted in FIGS. 1A, 1B or 2, including, for example, a data processing system. At ACT 302, the data processing system can receive factor values. The data processing system can receive values for each factor from one or more hops or elements in the hops. The data processing system can receive the values for factors based on a time interval, in real-time, or responsive to a request.

At ACT 304, the data processing system can compare the value for each factor with a factor threshold. The factor threshold can set for a particular type of factor. If the factor value does not satisfy the threshold, then the data processing system can set a performance value (Pvalue) equal to 1 at ACT 308 to indicate that the factor is problematic. If the factor value satisfies the factor threshold, then the data processing system can set the Pvalue equal to 0 at ACT 306. The factor value can satisfy the threshold based on the factor value being less than the threshold (e.g., if the factor corresponds to latency). In some cases, the factor value can satisfy the threshold by being greater than the threshold (e.g., if the factor corresponds to internet speed). At ACT 310, the data processing system can determine the Pvalue for all factors based on ACTs 306 and 308.

At ACT 312, the data processing system can generate a cumulative performance value (Pcummulative) for a particular type of performance issue by combining the Pvalues for each factor that is correlated with the performance issue. For example, a particular performance issue can be correlated with a first factor and a second factor. Based on the values for the first and second factors and corresponding first and second factor thresholds, the data processing system can determine a P1value for the first factor and a P2value for the second factor based on ACT 304. The data processing system can identify a weight for the first factor (F1w) and a weight for the second factor (F2w). The data processing system can determine the Pcummulative as: P1value*F1w+ P2value*F2w. The Pcummlative can be for a particular performance issue.

At ACT 314, the data processing system can determine whether Pcummulative for a particular performance issue is greater than or equal to a threshold for that performance issue. If Pcummulative is greater than or equal to the threshold, the data processing system can proceed to ACT 318 to determine there is a performance issue at the corresponding hop. The data processing system can then proceed to ACT 320 to perform an action for one or more elements associated with the hop to address the performance issue.

If, however, the performance metric is less than the performance threshold, the data processing system can proceed to ACT 316 to determine that there is no performance issue at the corresponding hop. The data processing system can proceed to compute performance metrics for other hops or other types of performance metrics. The data processing system can wait a time interval and then receive new values for factors to generate an updated performance metric.

Figure 4:
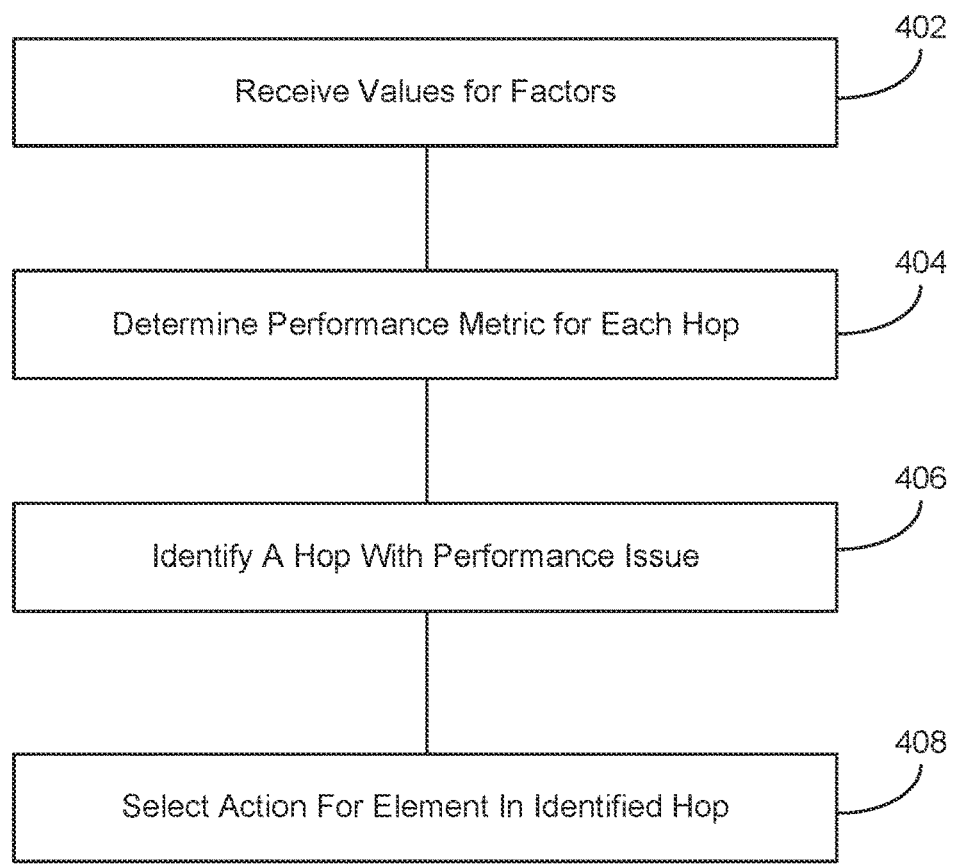
FIG. 4 depicts an example method for managing performance of elements in a multi-hop network topology, in accordance with an implementation.

FIG. 4 depicts an example flow diagram for managing performance of elements in a multi-hop network topology, in accordance with an implementation. The process 400 can be performed by one or more component or system depicted in FIGS. 1A, 1B or 2, including, for example, a data processing system. At ACT 402, the data processing system can receive values for factors. The data processing system can receive values for factors associated with elements forming hops in a multi-hop network topology through which a client device establishes a session to access a service provided by one or more servers. For example, the data processing system can receive values for factors associated with a client device, values for factors associated with a cloud connector, values for factors associated with a gateway service, values for factors associated with an intermediary device, values for factors associated with a desktop delivery controller, etc. The data processing system can receive the values based on a time interval, periodically, responsive to a request or indication of a performance issue.

At ACT 404, the data processing system can determine a performance metric for each hop. The data processing system can use a function that correlates a type of performance issue at a hop with particular factors. The function can indicate one or more factors that may be a root cause of a performance issue with one or more elements in the hop.

For example, the data processing system can access a map correlating types of performance issues to types of factors and elements in hops in a multi-hop network topology through which the session is established between the client device and one or more servers to access the service provided by the one or more servers. The data processing system can identify, from the map, a first type of performance issue and a corresponding first set of factors that correlate to a first hop in the multi-hop network topology that is formed by a first one or more elements. The data processing system can receive, from the first one or more elements, values for the first set of factors and then determine the performance metric based on the values for the first set of factors.

At ACT 406, the data processing system can identify a hop in the network topology that has a performance issue based on the performance metric. For example, the performance metric can exceed a threshold, which can indicate that the corresponding hop has a performance issue.

At ACT 408, the data processing system can select an action for one or more elements in the hop to resolve the performance issue. The action can include rebooting the elements in the hop, generating a ticket to cause a technical support agent to remedy the problem, or other alert or indication.

The above-mentioned elements or entities may be implemented in hardware, or a combination of hardware and software, in one or more embodiments. Components may be implemented using hardware or a combination of hardware or software detailed above in connection with FIGS. 1A-1B. For instance, these elements or entities can include any application, program, library, script, task, service, process or any type and form of executable instructions executing on hardware of a device. The hardware includes circuitry such as one or more processors in one or more embodiments.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

It will be further understood that various changes in the details, materials, and arrangements of the parts that have been described and illustrated herein may be made by those skilled in the art without departing from the scope of the following claims.

What is claimed is:

1. A method of managing performance of elements in a multi-hop network topology providing sessions between client devices and servers, comprising:

receiving, by one or more processors, values for a plurality of factors associated with a plurality of elements forming a plurality of hops in a multi-hop network topology through which a client device establishes a session to access a service provided by one or more servers;

selecting, by the one or more processors, two or more factors from the plurality of factors via a map stored in a data repository that correlates types of performance issues to types of factors and elements in the multi-hop network topology, wherein the map comprises a plurality of factor weights corresponding to the plurality of factors;

determining, by the one or more processors, a performance metric for each hop in the plurality of hops based on a weighted combination of the values for the two or more factors selected from the plurality of factors via the map;

identifying, by the one or more processors, a hop of the plurality of hops as having a first type of performance issue of the types of performance issues based on the performance metric for the hop exceeding a threshold provided in the map for the first type of performance issue; and selecting, by the one or more processors responsive to the performance metric of the hop exceeding the threshold, an action to take on at least one element of the plurality of elements forming the hop.

2. The method of claim 1, comprising:

receiving, by the one or more processors, first values for a first plurality of factors of the plurality of factors from an application executing on the client device;

receiving, by the one or more processors, second values for a second plurality of factors of the plurality of factors from an intermediary service executed on an intermediary device in the multi-hop network topology that is intermediary to the client device and the one or more servers providing the service; and receiving, by the one or more processors, third values for a third plurality of factors of the plurality of factors from a second service executing on the one or more servers.

3. The method of claim 2, wherein the first plurality of factors comprise at least one of loopback latency, processor utilization of the client device, memory utilization of the client device, connection errors, or latency to internal components of the client device.

4. The method of claim 2, wherein the second plurality of factors or the third plurality of factors comprise at least one of an identifier of a connector used to establish the session with the client device; a resource location of the connector, a public Internet protocol ("IP") address, processor utilization, memory utilization, latency associated with the intermediary device, throughput associated with the intermediary device, a domain name service ("DNS") resolution time, or a control path latency at each of a plurality of components.

5. The method of claim 1, comprising:

identifying, by the one or more processors, a deployment environment for the service based on a configuration file associated with the client device, wherein the deployment environment comprises one of a virtual application hosted by the one or more servers or the virtual application hosted on-premises; and determining, by the one or more processors, the performance metric for each of the plurality of hops using one or more factor thresholds selected based on the deployment environment.

6. The method of claim 1, comprising:
accessing, by the one or more processors, the map correlating the types of performance issues to the types of factors and the elements in hops in the multi-hop network topology;
identifying, by the one or more processors from the map, the first type of performance issue and a corresponding first plurality of factors of the plurality of factors;
identifying, by the one or more processors, a first plurality of factor thresholds established for the first type of performance issue;
determining, by the one or more processors, the performance metric based on a comparison of a first plurality of values of the first plurality of factors with the corresponding first plurality of factor thresholds; and
selecting, by the one or more processors, the action responsive to the performance metric exceeding the threshold.

7. The method of claim 6, comprising:
determining, by the one or more processors, a cumulative performance value based on a comparison of each of the first plurality of values with the corresponding first plurality of thresholds; and
determining, by the one or more processors, the performance metric based on the cumulative performance value.

8. The method of claim 6, comprising:
identifying, by the one or more processors based on the first type of performance issue, a first plurality of factor weights corresponding to the first plurality of factors;
comparing, by the one or more processors, each of the first plurality of values with the corresponding first plurality of factor thresholds to identify one more of the first plurality of values that exceed the corresponding first plurality of factor thresholds; and
determining, by the one or more processors, the performance metric based on one or more of the first plurality of factor weights that correspond to one or more of the first plurality of factors of the identified one or more of the first plurality of values.

9. The method of claim 1, comprising:
identifying, by the one or more processors, a plurality of factor thresholds established based on nominal sessions between client devices and the one or more servers to access services; and
determining, by the one or more processors, the performance metric based on the a comparison of the values for the plurality of factors with the plurality of factor thresholds.

10. The method of claim 1, wherein the action comprises at least one of rebooting the at least one element, generating an electronic ticket for the at least one element, or transmitting an alert to an administrator associated with the at least one element.

11. A system to manage performance of elements in a multi-hop network topology providing sessions between client devices and servers, comprising:
one or more processors and memory configured to:
receive values for a plurality of factors associated with a plurality of elements forming a plurality of hops in a multi-hop network topology through which a client device establishes a session to access a service provided by one or more servers;
select two or more factors from the plurality of factors via a map stored in a data repository that correlates types of performance issues to types of factors and elements in the multi-hop network topology, wherein the map comprises a plurality of factor weights corresponding to the plurality of factors;
determine a performance metric for each hop in the plurality of hops based on a weighted combination of the values for the two or more factors selected from the plurality of factors via the map;
identify a hop of the plurality of hops as having a first type of performance issue of the types of performance issues based on the performance metric for the hop exceeding a threshold provided in the map for the first type of performance issue; and
select, responsive to the performance metric of the hop exceeding the threshold, an action to take on at least one element of the plurality of elements forming the hop.

12. The system of claim 11, wherein the one or more processors are further configured to:
receive first values for a first plurality of factors of the plurality of factors from an application executing on the client device;
receive second values for a second plurality of factors of the plurality of factors from an intermediary service executed on an intermediary device in the multi-hop network topology that is intermediary to the client device and the one or more servers providing the service; and
receive third values for a third plurality of factors of the plurality of factors from a second service executing on the one or more servers.

13. The system of claim 11, wherein the one or more processors are further configured to:
identify a deployment environment for the service based on a configuration file associated with the client device, wherein the deployment environment comprises one of a virtual application hosted by the one or more servers or the virtual application hosted on-premises; and
determine the performance metric for each of the plurality of hops using one or more thresholds selected based on the deployment environment.

14. The system of claim 11, wherein the one or more processors are further configured to:
access the map correlating the types of performance issues to the types of factors and the elements in hops in the multi-hop network topology;
identify, from the map, the first type of performance issue and a corresponding first plurality of factors of the plurality of factors;
identify a first plurality of factor thresholds established for the first type of performance issue;
determine the performance metric based on a comparison of a first plurality of values of the first plurality of factors with the corresponding first plurality of factor thresholds; and
select the action responsive to the performance metric exceeding the threshold.

15. The system of claim 14, wherein the one or more processors are further configured to:
determine a cumulative performance value based on a comparison of each of the first plurality of values with the corresponding first plurality of thresholds; and
determine the performance metric based on the cumulative performance value.

16. The system of claim 14, wherein the one or more processors are further configured to:
- identify, based on the first type of performance issue, a first plurality of factor weights corresponding to the first plurality of factors;
- compare each of the first plurality of values with the corresponding first plurality of factor thresholds to identify one more of the first plurality of values that exceed the corresponding first plurality of factor thresholds; and
- determine the performance metric based on one or more of the first plurality of factor weights that correspond to one or more of the first plurality of factors of the identified one or more of the first plurality of values.

17. The system of claim 11, wherein the one or more processors are further configured to:
- identify a plurality of factor thresholds established based on nominal sessions between client devices and the one or more servers to access services; and
- determine the performance metric based on the a comparison of the values for the plurality of factors with the plurality of factor thresholds.

18. The system of claim 11, wherein the action comprises at least one of rebooting the at least one element, generating an electronic ticket for the at least one element, or transmitting an alert to an administrator associated with the at least one element.

19. A non-transitory computer readable medium storing instructions that, when executed by one or more processors, cause the one or more processors to:
- receive values for a plurality of factors associated with a plurality of elements forming a plurality of hops in a multi-hop network topology through which a client device establishes a session to access a service provided by one or more servers;
- select two or more factors from the plurality of factors via a map stored in a data repository that correlates types of performance issues to types of factors and elements in the multi-hop network topology, wherein the map comprises a plurality of factor weights corresponding to the plurality of factors;
- determine a performance metric for each hop in the plurality of hops based on a weighted combination of the values for the two or more factors selected from the plurality of factors via the map;
- identify a hop of the plurality of hops as having a first type of performance issue of the types of performance issues based on the performance metric for the hop exceeding a threshold provided in the map for the first type of performance issue; and
- select, responsive to the performance metric of the hop exceeding the threshold, an action to take on at least one element of the plurality of elements forming the hop.

20. The non-transitory computer readable medium of claim 19, wherein the instructions further comprise instructions to:
- identify, from the map, a first plurality of factor thresholds for the first type of performance issue; and
- determine the performance metric based on a comparison of the values for the first plurality of factors with the first plurality of factor thresholds.

* * * * *